United States Patent
Klik et al.

(10) Patent No.: US 10,112,590 B2
(45) Date of Patent: Oct. 30, 2018

(54) VALVE UNIT FOR MODULATING PRESSURE IN AN AIR-BRAKE SYSTEM

(71) Applicant: WABCO GmbH, Hannover (DE)

(72) Inventors: Stefan Klik, Hannover (DE); Karsten Runge, Springe (DE); Andreas Teichmann, Isernhagen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 15/505,458

(22) PCT Filed: Aug. 6, 2015

(86) PCT No.: PCT/EP2015/001627
§ 371 (c)(1),
(2) Date: Feb. 21, 2017

(87) PCT Pub. No.: WO2016/029993
PCT Pub. Date: Mar. 3, 2016

(65) Prior Publication Data
US 2017/0253223 A1   Sep. 7, 2017

(30) Foreign Application Priority Data

Aug. 27, 2014 (DE) .......................... 10 2014 012 709

(51) Int. Cl.
*B60T 8/34* (2006.01)
*B60T 17/00* (2006.01)
(Continued)

(52) U.S. Cl.
CPC .............. *B60T 8/342* (2013.01); *B60T 8/362* (2013.01); *B60T 8/3605* (2013.01);
(Continued)

(58) Field of Classification Search
CPC ........ B60T 8/342; B60T 8/3675; B60T 8/362; B60T 13/26; B60T 17/008
See application file for complete search history.

(56) References Cited

U.S. PATENT DOCUMENTS 3,953,632 A * 4/1976 Robinson ................ B29C 70/08
                                                            428/95
3,977,734 A   8/1976 Ronnhult et al.
(Continued)

FOREIGN PATENT DOCUMENTS

DE   2224274 A1   11/1973
DE   2817465 A1   10/1979
(Continued)

OTHER PUBLICATIONS

European Patent Office, Rijswijk, Netherlands, International Search Report of International Application No. PCT/EP2015/001627, dated Oct. 15, 2015, 3 pages.

*Primary Examiner* — Melody M Burch
(74) *Attorney, Agent, or Firm* — Brinks Gilson & Lione

(57) ABSTRACT

A valve unit (1) for modulating pressure in a compressed air braking system includes a brake pressure input (3), a brake pressure output (4), and a purge output (5), an inlet valve (6) and an outlet valve (7), both configured as a diaphragm valve, and respective precontrol valves (8, 9), which are each configured as a 3/2-way solenoid valve. For effective sound damping of the compressed air emerging into the environment when the outlet valve (7) is open, the valve unit (1) at the purge output (5) has a silencer (75) with a largely cylindrical silencer housing (76) with an inlet opening (77), a calming chamber (78), a large outlet opening (79) and a silencer insert (80.1) arranged upstream of the outlet opening (79) inside the silencer housing (76). The silencer is
(Continued)

air-permeable and sound-deadening and attached to the base housing (11) with base walls (83, 84).

13 Claims, 9 Drawing Sheets

(51) Int. Cl.
  *B60T 8/36* (2006.01)
  *B60T 13/26* (2006.01)
(52) U.S. Cl.
  CPC ............ *B60T 8/3675* (2013.01); *B60T 13/26* (2013.01); *B60T 17/008* (2013.01)

(56) References Cited

U.S. PATENT DOCUMENTS

| | | |
|---|---|---|
| 6,659,129 B1 | 12/2003 | Kiel et al. |
| 8,215,448 B2 | 7/2012 | Harting et al. |
| 8,672,421 B2 | 3/2014 | Eidenschink et al. |
| 2002/0167118 A1* | 11/2002 | Billiet .................. B22F 3/1103 264/432 |
| 2012/0175943 A1* | 7/2012 | Grebe .................. B60T 8/3605 303/113.2 |

FOREIGN PATENT DOCUMENTS

| | | |
|---|---|---|
| DE | 8208736 U1 | 8/1982 |
| DE | 4008095 A1 | 9/1991 |
| DE | 19605562 A1 | 8/1997 |
| EP | 0154214 A2 | 9/1985 |
| EP | 0352522 A1 | 1/1990 |
| EP | 0439303 A1 | 7/1991 |
| EP | 0443150 A1 | 8/1991 |
| EP | 0498584 A1 | 8/1992 |
| EP | 0596220 A1 | 5/1994 |
| EP | 2322397 A1 | 5/2011 |
| GB | 1583341 | 1/1981 |

* cited by examiner

VALVE UNIT FOR MODULATING PRESSURE IN AN AIR-BRAKE SYSTEM

TECHNICAL FIELD

The invention concerns a valve unit for modulating pressure in a compressed air braking system, with a brake pressure input, a brake pressure output and a purge output, and with an inlet valve configured as a diaphragm valve, an outlet valve configured as a diaphragm valve and with, for each diaphragm valve, respective precontrol valves which are each configured as a 3/2-way solenoid valve and are arranged in an elongate valve housing, which is divided by a division plane that is largely horizontal in the installation position into a base housing and a housing cover, wherein the brake pressure input and the brake pressure output and the purge output are arranged in the base housing, the diaphragm valves are arranged behind each other in the longitudinal direction in the base housing between the brake pressure input and the brake pressure output, with parallel actuation axes and with diaphragms arranged in a common diaphragm plane, largely corresponding to the division plane, and clamped between the base housing and the housing cover, and the precontrol valves are arranged in the housing cover.

BACKGROUND

In lock-protected compressed air braking systems, i.e. anti-lock braking systems, of wheeled vehicles such as motor vehicles and rail vehicles, a valve unit for pressure modulation is arranged in each brake line leading from a brake valve to the wheel brake cylinders. This valve unit has an inlet valve and an outlet valve. By means of the inlet valve, a brake pressure output can alternately be connected to or shut off from a brake pressure input. The brake pressure output is connected to a portion of a brake line leading to at least one wheel brake cylinder, and a portion of the brake line coming from the brake valve is connected to the brake pressure input. The brake pressure output may be alternately connected to or shut off from a purge output using the outlet valve, wherein the purge output usually leads via a check valve and/or a screen to the environment.

Because of large volume flows to be switched, and correspondingly large flow cross-sections to be opened and closed, the inlet valve and the outlet valve are frequently configured as pneumatically actuatable diaphragm valves which can be activated via a respective precontrol valve configured as 3/2-way solenoid valve. A diaphragm valve has a largely circular, disc-like flexible membrane which is clamped at its edge in a valve housing. A central, round valve seat of a cylindrical inner flow channel, with an annular outer flow channel arranged concentrically thereto, is arranged on the axial inside of the diaphragm on which the flow channels are arranged which are connected to the compressed air inputs and compressed air outputs. On the axially opposite outside of the diaphragm, a control chamber is arranged which can be loaded by the assigned precontrol valve alternately with a high control pressure, usually taken from the brake pressure input, or with a low control pressure (ambient pressure), usually taken from the purge output. When the control chamber is loaded with the high control pressure, the diaphragm is pressed against the valve seat, whereby the inner flow channel is isolated from the outer flow channel, which corresponds to the closed state of the diaphragm valve concerned. When the control chamber is loaded with the low control pressure, the diaphragm which due to its shape normally lies automatically on the valve seat, is lifted away from the valve seat by the brake pressure predominating in the flow channels and moved in the direction of the control chamber, whereby the inner flow channel is connected to the outer flow channel, which corresponds to the open state of the diaphragm valve concerned.

Such a valve unit has the switch functions "build up pressure", "maintain pressure", and "reduce pressure". In the "build up pressure" switch function of the valve unit, the inlet valve is opened and the outlet valve is closed, so that the brake pressure introduced via the brake valve at the brake pressure input is conducted unchanged to the brake pressure output and to at least one wheel brake cylinder connected thereto. Since the "build up pressure" switch function corresponds to the rest state of the valve unit, the precontrol valve of the inlet valve, when its magnetic coil is not powered, connects the control chamber of the inlet valve to a control line carrying the low control pressure. Similarly, the precontrol valve of the outlet valve, when its magnetic coil is not powered, connects the control chamber of the outlet valve to a control line carrying the high control pressure.

In the "maintain pressure" switch function of the valve unit, the inlet valve and the outlet valve are closed so that the brake pressure, present at the brake pressure output and at the at least one wheel brake cylinder connected thereto, is held constant. To set this switch function, only the precontrol valve of the inlet valve is switched by powering its magnetic coil, and hence the control chamber of the inlet valve is loaded with the high control pressure.

In the "reduce pressure" switch function of the valve unit, the inlet valve is closed and the outlet valve opened, so that the brake pressure output and the at least one wheel brake cylinder connected thereto are purged. To set this switch function, both precontrol valves are switched by powering their magnetic coils, and hence the control chamber of the inlet valve is loaded with the high control pressure and the control chamber of the outlet valve is loaded with the low control pressure.

The "maintain pressure" and "reduce pressure" switch functions of the valve unit are antilock functions with which a braking-induced locking of the at least one assigned wheel is avoided. These switch functions are controlled by a corresponding actuation of the precontrol valves by a control unit of the anti-lock system, in which the signals from the wheel speed sensors are analyzed to detect an impending or existing locking of the braked wheels.

With regard to the geometric arrangement of the compressed air inputs and compressed air outputs, the inlet valves and outlet valves configured as diaphragm valves, and the precontrol valves configured as solenoid valves, in a valve housing, various embodiments of valve units are known.

Thus for example publications DE 22 24 274 C3, DE 34 08 123 A1, DE 38 25 549 A1, DE 40 05 608 A1 and DE 40 08 095 A1 describe various embodiments of valve units in which the diaphragm planes of the inlet valve and outlet valve are oriented perpendicular or parallel to each other. The precontrol valves configured as 3/2-way valves in these valve units are arranged either with different orientation of the actuation axes close to the assigned diaphragm valve, or parallel and radially adjacent to each other in different regions of the respective valve housing.

Because of the arrangement of the inlet valves and the outlet valves, and the precontrol valves, but also of the respective compressed air inputs and outputs, in the abovementioned valve units a multipiece design and complex machining of the respective valve housing are required. In particular, the respective arrangement of the diaphragms of the inlet valve and outlet valve in different diaphragm planes requires multiple re-clamping of the housing parts for machining of the valve seats and the channel or chamber edges between which the diaphragms are clamped. To reduce the production complexity, therefore, valve units have already been proposed in which the diaphragm valves are arranged with parallel actuation axes and diaphragms arranged in a common diaphragm plane, largely corresponding to a division plane between two housing parts.

Such a valve unit is described for example in DE 25 17 571 A1. In this known valve unit, an elongate valve housing is divided by a division plane that is horizontal in the installation position into a housing lower part and a housing upper part. The brake pressure input and the purge output are arranged largely axially opposite in the longitudinal direction with horizontal orientation, and the brake pressure output, also with horizontal orientation, is arranged largely centrally at right angles thereto in the housing lower part. The diaphragm valves are arranged in the housing lower part between the brake pressure input and the purge output, with parallel actuation axes and diaphragms arranged in a common diaphragm plane, largely corresponding to the division plane, being clamped between the housing lower part and the housing upper part, behind each other in the longitudinal direction of the valve housing. The precontrol valve of the inlet valve and the precontrol valve of the outlet valve are each arranged with vertical orientation of their actuation axes and with the same switching directions above the respective assigned diaphragm valve, radially adjacent to each other in the housing upper part.

In a further such valve unit known from EP 0 498 584 B1, the valve housing is divided by a division plane which is vertical in the installation position into an input housing and an output housing. The brake pressure input is arranged with horizontal orientation at the top in the input housing. The brake pressure output is arranged, with horizontal orientation, largely axially opposite the brake pressure input in the output housing, whereas the purge output is arranged oriented vertically downward in the output housing. The diaphragm valves are arranged vertically above each other in the output housing between the brake pressure output and the purge output, with parallel actuation axes and diaphragms arranged in a common diaphragm plane, largely corresponding to the division plane, being clamped between the output housing and the input housing. The precontrol valve of the inlet valve and the precontrol valve of the outlet valve are each arranged with horizontal orientation of their actuation axes and opposite switching directions, approximately at right angles to the compressed air inputs and compressed air outputs and parallel to the division plane, radially adjacent to each other in the input housing. The magnetic coils of the precontrol valves are arranged in a magnet block which, together with the mechanical components of the solenoid valve used, is arranged between a housing upper part and a housing lower part of the input housing. For sealing, seals or sealing rings are arranged between firstly the magnet block, valve blocks and valve seats of the solenoid valves, and secondly the housing upper part and housing lower part of the input housing. To fix the housing upper part and housing lower part to the magnet block of the solenoid valves, and also to clamp the diaphragms of the diaphragm valves, the housing upper part and the housing lower part of the input housing are each bolted to the output housing.

Finally, DE 10 2008 028 439 B3 describes a valve unit in which an elongate valve housing is divided by division planes that are largely horizontal in the installation position, into a housing lower part, a housing upper part and an intermediate plate arranged in-between. The brake pressure input, the brake pressure output and the purge output are each arranged with horizontal orientation in the housing lower part. The diaphragm valves are arranged in the housing lower part with parallel actuation axes and diaphragms arranged in a common diaphragm plane, largely corresponding to the division plane between the housing lower part and the intermediate plate, being clamped between the housing lower part and the longitudinal intermediate plate, behind each other in the longitudinal direction. The precontrol valve of the inlet valve and the precontrol valve of the outlet valve are each arranged with vertical orientation of their actuation axes and with the same switching directions approximately centrally above the diaphragm valves, radially adjacent to each other in the housing upper part. The intermediate plate is bolted to the housing lower part. The housing upper part is bolted via an outer cover to the intermediate plate or the housing lower part. Seals are arranged in the division plane between the housing upper part and intermediate plate.

In the known valve units, the purge output normally leads to the environment via a check valve and/or a screen. In the embodiments of the valve units according to DE 22 24 274 C3, DE 25 17 571 A1, DE 34 08 123 A1, DE 40 08 095 A1 and EP 0 498 584 B1, the purge output is in each case connected to a check valve configured as a self-acting diaphragm valve. In the embodiment of the valve unit according to EP 0 498 584 B1, a screen is also mounted upstream of the check valve in the flow direction.

A check valve and/or a screen can protect the purge output and the upstream outlet valve relatively well against the penetration of splash water and eddying dirt particles. The noise generated by the outflow of compressed air when the outlet valve is open, which increases the noise emissions of the vehicle concerned and is perceived as unpleasant by passers-by, can however be damped only in adequately in this way.

SUMMARY OF THE INVENTION

The invention is therefore based on the object of providing a valve unit of the type cited initially with an effective silencer at the purge output, which silencer is economic to produce and can be installed compactly on the valve housing.

This object is achieved in that the valve unit at the purge output is provided with a silencer which comprises a largely cylindrical silencer housing with an inlet opening, a calming chamber arranged radially on the inside, a large outlet opening and a silencer insert arranged upstream of the outlet opening inside the silencer housing and made of an air-permeable and sound-deadening material, and that the silencer is attached to the base housing with base walls oriented parallel to the division plane, between the brake pressure input and the brake pressure output.

The invention is therefore based on a valve unit known in itself for modulating pressure in a compressed air braking system, which has a brake pressure input, a brake pressure output, and a purge output, and has an inlet valve configured as a diaphragm valve, an outlet valve configured as a diaphragm valve, and for each diaphragm valve a precontrol valve which is configured as a 3/2-way solenoid valve. The compressed air inputs and compressed air outputs, the diaphragm valves and solenoid valves, are arranged in an elongate valve housing which is divided by a division plane that is largely horizontal in the installation position into a base housing and a housing cover. The brake pressure input and the brake pressure output are arranged for example with horizontal orientation, largely axially opposite in the longitudinal direction of the valve housing, and the purge output is arranged for example in-between, oriented vertically downward in the base housing. The diaphragm valves are arranged in the base housing between the brake pressure input and the brake pressure output, with parallel actuation axes and diaphragms arranged in a common diaphragm plane, largely corresponding to the division plane, being clamped between the base housing and the housing cover, behind each other in the longitudinal direction. The precontrol valves however are arranged in the housing cover.

For effective sound damping of the compressed air emerging from the purge output when the outlet valve is opened, according to the invention the valve unit at the purge output is provided with a silencer which comprises a largely cylindrical silencer housing with an inlet opening, a calming chamber arranged radially on the inside, a large outlet opening and a silencer insert arranged upstream of the outlet opening inside the silencer housing, and wherein said insert is made of an air-permeable and sound-deadening material. The silencer, with base walls of the silencer housing oriented parallel to the division plane, is fixed to the base housing between the brake pressure input and the brake pressure output.

When the outlet valve is opened, compressed air flows at relatively high pressure out of the brake line portion connected to the brake pressure output, via the purge output and the inlet opening, into the calming chamber of the silencer and from there, via the silencer insert and outlet opening, into the environment. Because of the relatively large volume of the calming chamber, the large outlet opening and the sound-deadening material of the silencer insert, the flow speed of the composite air is reduced and compressed air vibrations are diminished. In this way, the noise level of the emerging compressed air—which, in a compressed air jet emerging at high flow speed at the brake pressure output, is caused substantially by turbulence at the jet edge—is significantly reduced with relatively simple means. In addition, the purge output and the outlet valve upstream thereof are also protected, in particular by the silencer insert of the silencer, against the penetration of splash water and eddying dirt particles.

For reasons of production and assembly technology, the silencer housing consists of a largely pot-like cylindrical bottom housing with a cylinder wall and a housing floor, and of a flat housing lid, wherein in the installed state, the housing floor of the bottom housing faces the division plane and is provided with the inlet opening lying against the purge output.

To achieve a very large outlet area, the outlet opening of the silencer housing is arranged in the cylinder wall of the bottom housing and extends, with an orientation relative to the brake pressure input, over an angular region of up to 270°.

In order to achieve an adequate stability of the silencer housing despite the large outlet opening, the outlet opening contains a plurality of webs distributed over the periphery of the bottom housing and arranged between the housing floor and an outer edge of the bottom housing.

For easier installation and to fix the position of the bottom housing of the silencer, the housing floor of the bottom housing advantageously comprises at least one elevation directed axially outward, such as for example a web or a stud, which in the installed state engages in a corresponding recess, for example a groove or bore, of the base housing.

In one embodiment, the silencer insert has a partially cylindrical shell which, in the mounted state, lies on the inside against the outlet opening of the silencer housing and is reinforced by a flat circular floor portion.

According to a second embodiment, the silencer insert has two partially cylindrical shells which are arranged coaxially to each other and radially spaced apart, and are connected by a circular floor portion and circumferentially directly connected together, and of which the radially outer shell, in the installed state, lies on the inside against the outlet opening of the silencer housing.

Irrespective of the concrete form, the silencer insert may be made as a braid of mineral fibers, metal fibers or plastic fibers, wherein these fibers may be arranged ordered largely in the form of a weave or disordered in the form of a fleece.

Alternatively, the silencer insert may also be made as a porous sintered component of metal, for example bronze, copper, steel or aluminum, or of plastic, i.e. correspondingly pressed or injection-molded to be air-permeable.

Another possibility is that the silencer insert is made as a porous casting of metal, such as aluminum or plastic. Such a porous casting may be produced in that the metal or plastic is cast with salt grains mixed therein which are then washed out.

To ensure that the dimensions of the valve housing are not substantially increased by the silencer, it is preferably provided that on its underside facing away from the division plane, the base housing comprises a recess in which the silencer housing is at least partially inserted in the installed state.

Also, the silencer housing is advantageously fixed via a screw connection of the housing lid to the base housing of the valve unit, since this saves construction space compared with a separate fixing of the housing lid to the bottom housing of the silencer and of the entire silencer housing to the base housing, and reduces installation complexity.

Insofar as the base housing of the valve unit comprises a connecting channel adjacent to the silencer and open towards the outside, in the installed state this connecting channel may be closed by the housing floor of the silencer housing. Here, sealing elements are then arranged between the housing walls of the base housing of the valve unit, delimiting the connecting channel, and the housing floor of the silencer housing. This embodiment concerns in particular a U-shaped connecting channel present at the respective valve unit, via which the output-side central channel of the inlet valve is connected to the input-side ring channel of the outlet valve, and which would be difficult to decore if the base housing is produced conventionally as a diecast alloy component with an outwardly closed construction.

BRIEF DESCRIPTION OF THE DRAWINGS

For further clarification of the invention, drawings of several exemplary embodiments are attached to the description. In the drawings.

DETAILED DESCRIPTION OF THE DRAWINGS

Figure 8:
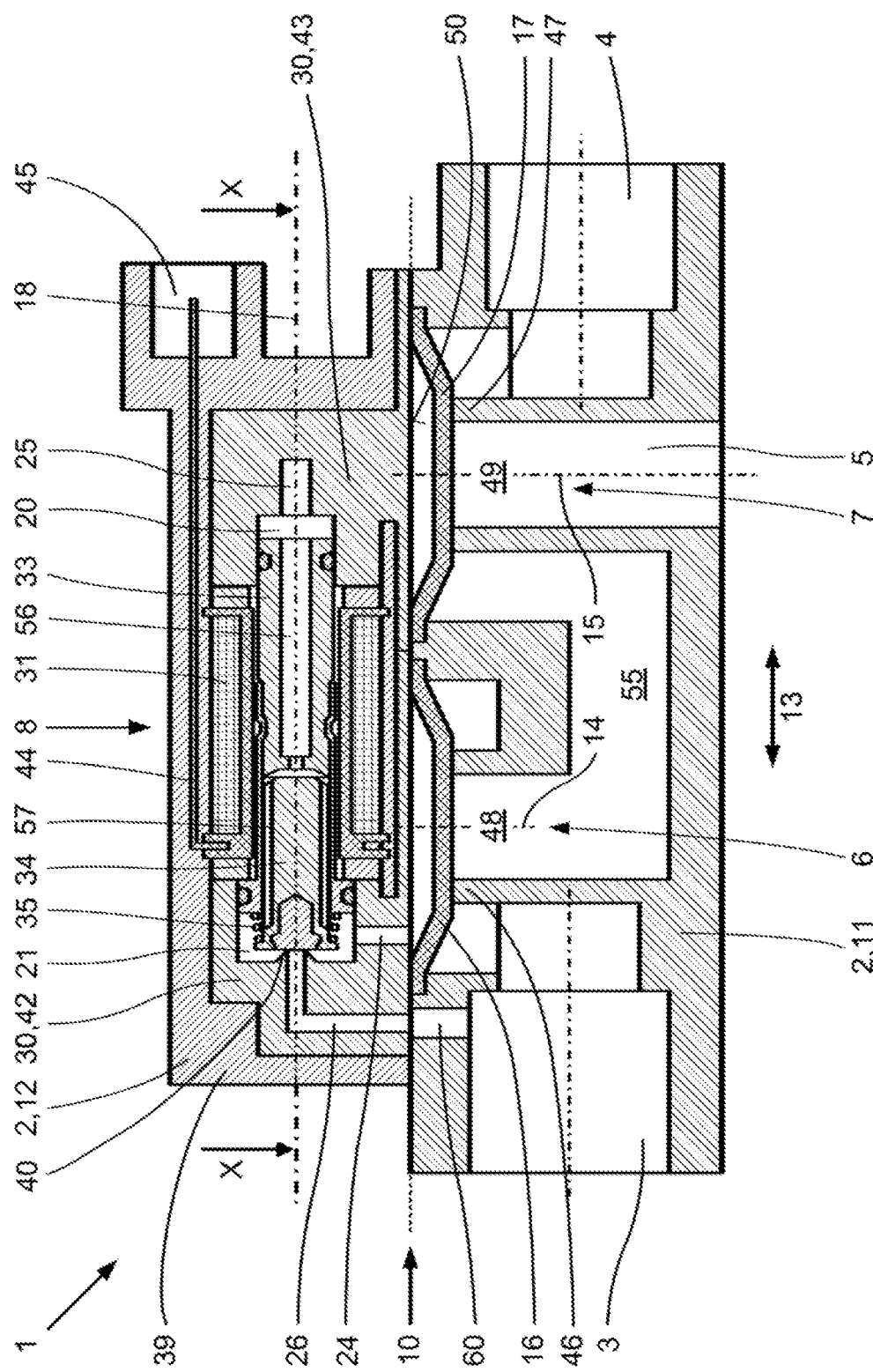
FIG. 8 shows an exemplary embodiment of a valve unit in a first vertical longitudinal section.

First, with reference to FIGS. 8 to 10, the structure and function in principle of a valve unit 1 are described, which is used below merely as an example to explain the structure and arrangement of a silencer according to the invention. The valve unit 1 is shown in FIG. 8 in a first vertical longitudinal section VIII-VIII according to FIG. 10, in FIG. 9 in a second vertical longitudinal section IX-IX according to FIG. 10, and in FIG. 10 in a horizontal section X-X according to FIG. 8 and FIG. 9.

A brake pressure input 3, a brake pressure output 4, a purge output 5, an inlet valve 6 configured as a diaphragm valve, an outlet valve 7 configured as a diaphragm valve, and for each diaphragm valve 6, 7 a precontrol valve 8, 9 configured as a 3/2-way solenoid valve, are arranged in an elongate valve housing 2. The valve housing 2 is divided by a division plane 10, that is largely horizontal in the installation position, into a base housing 11 and a housing cover 12. The brake pressure input 3 and the brake pressure output 4 are arranged with horizontal orientation, largely axially opposite in the longitudinal direction 13 of the valve housing 2, and the purge output 5 is arranged for example in-between, oriented vertically downward in the base housing 11. The two diaphragm valves 6, 7 are arranged in the base housing 11 between the brake pressure input 3 and the brake pressure output 4, with parallel actuation axes 14, 15 and diaphragms 16, 17 arranged in a common diaphragm plane, largely corresponding to the division plane 10, being clamped between the base housing 11 and the housing cover 12, behind each other in the longitudinal direction 13. The two precontrol valves 8, 9 however are arranged in the housing cover 12.

The precontrol valve 8 of the inlet valve 6 and the precontrol valve 9 of the outlet valve 7 are arranged in the housing cover 12 in the longitudinal direction 13, with orientation of their actuation axes 18, 19 parallel to the division plane 10, largely centrally over the diaphragms 16, 17 of the inlet valve 6 and the outlet valve 7. The housing cover 12 has a central insert part 30 provided with valve bores 20, 21; 22, 23 and control channels 24, 25, 26; 27, 28, 29, in which the magnetic coils 31, 32 and the mechanical components of the precontrol valves 8, 9 and the respective valve core 33, 36, the respective valve rotor 34, 37 and the respective valve spring 35, 36 are inserted, and around which a plastic 39 is molded.

In the present case, the precontrol valves 8, 9 are configured as separate solenoid valves which, each with opposing switching direction and with valve seat 40, 41 facing the diaphragm 16, 17 of the assigned inlet valve or outlet valve 6, 7, are each arranged axially parallel and radially adjacent to each other in the insert part 30. The insert part 30 consists of the input-side part 42 and an output-side part 43 which surround the magnetic coils 31, 32 and the mechanical components 33-35; 36-38 of the solenoid valves 8, 9 at the end. Connecting cables 44 of the magnetic coils 31, 32 are routed inside the over-molding 39 of the housing cover 12 and terminate in a connecting bush 45 formed by the over-molding 39.

The diaphragms 16, 17 of the inlet valve 6 and the outlet valve 7, because of their shaping, each lie on a valve seat 46, 47 of a cylindrical central channel 48, 49, which can be connected to or shut off from a cylindrical ring channel 53, 54 arranged coaxially thereto by loading the control chamber 51, 52, delimited by the respective diaphragm 16, 17 and an inner wall 50 of the housing cover 12 facing the division plane 10, with a low or high control pressure. The ring channel 53 of the inlet valve 6 is connected to the brake pressure input 3. The central channel 48 of the inlet valve 6 is connected via a connecting channel 55 to the ring channel 54 of the outlet valve 7, which is in turn connected to the brake pressure output 4. The cylindrical ring channel 49 of the outlet valve 7 is connected to the purge output 5. Hence the brake pressure output 4 can be alternately connected to or shut off from the brake pressure input 3 via the inlet valve 6. Hence the brake pressure output 4 can be alternately connected to or shut off from the brake pressure input 5 via the inlet valve 7. In the present embodiment of the valve unit 1, the insert part 30 of the housing cover 12 extends up to the division plane 10 between the base housing 11 and the housing cover 12, and completely delimits the control chamber 51, 52 of the diaphragm valves 8, 9.

The valve unit 1 has the switch functions "build up pressure", "maintain pressure", and "reduce pressure". In the "build up pressure" switch function of the valve unit 1, the inlet valve 6 is opened and the outlet valve 7 is closed, so that the brake pressure introduced via the brake valve at the brake pressure input 3 is conducted unchanged to the brake pressure output 4 and to at least one wheel brake cylinder connected thereto. Since the "build up pressure" switch function corresponds to the rest state of the valve unit 1, the precontrol valve 8 of the inlet valve 6, when its magnetic coil 31 is unpowered, connects the control chamber 51 of the inlet valve 6 via the control channel 24, valve bore 21, longitudinal grooves 57 in the valve rotor 34, and a central bore 56 in the valve core 33, to a control channel 25 carrying a low control pressure which is connected to the purge output 5 in a manner not shown.

Figure 9:
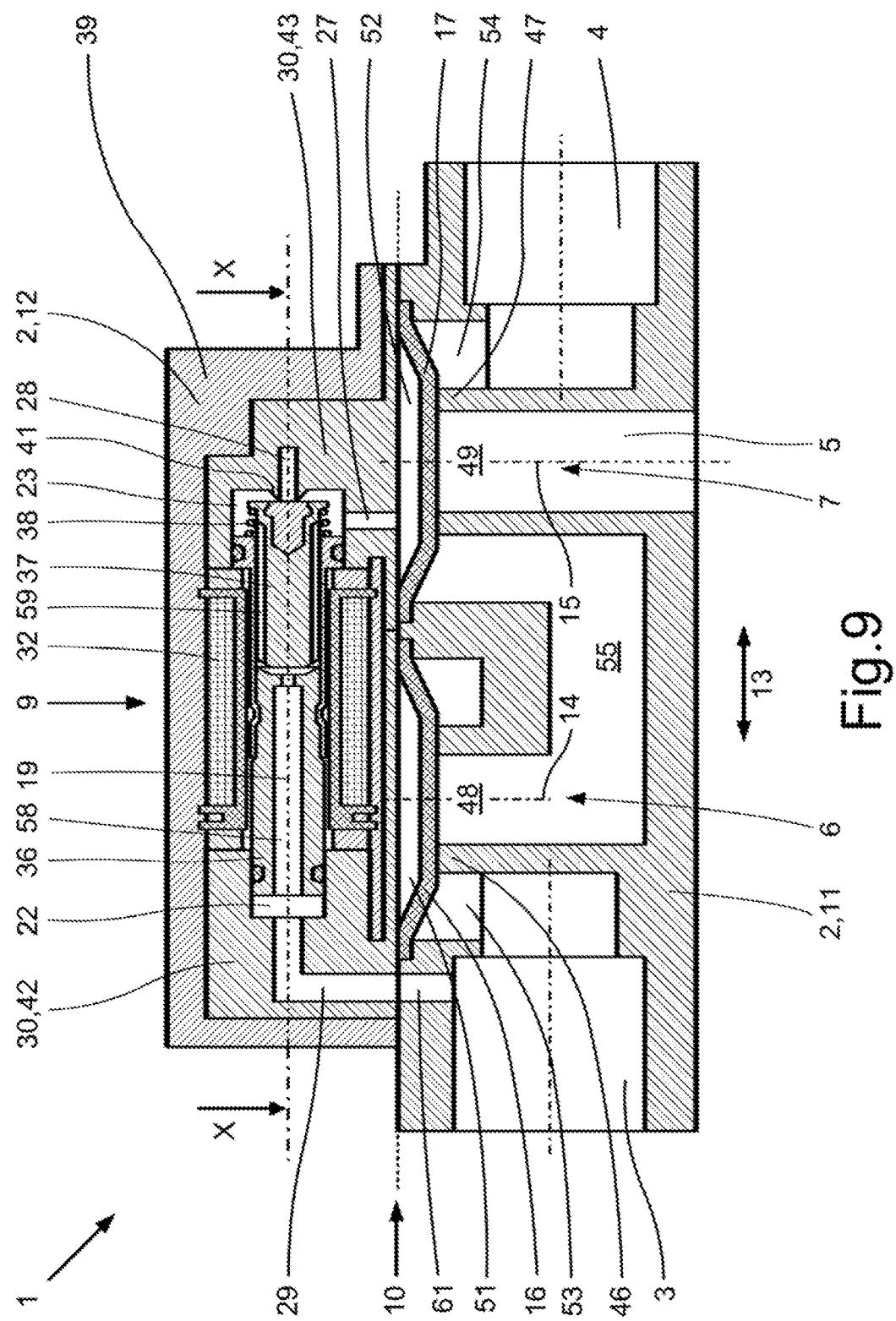
FIG. 9 shows the embodiment variant of the valve unit according to FIG. 8 in a second vertical longitudinal section.

The diaphragm 16, shown lying on the valve seat 46 of the inlet valve 6 in FIG. 8 and FIG. 9 because of it shaping, is in this case moved by a brake pressure present in the ring channel 53 in the direction of the control chamber 51, whereby the inlet valve 6 is opened. Similarly, the precontrol valve 9 of the outlet valve 7, when its magnetic coil 32 is unpowered, connects the control chamber 52 of the outlet valve 7 via the control channel 27, valve bore 23, longitudinal grooves 59 in the valve rotor 37, and a central bore 58 in the valve core 36, to a control channel 29 carrying a high control pressure which is connected to the brake pressure input 3 via a further control channel 61 arranged in the base housing 11.

In the "maintain pressure" switch function of the valve unit 1, the inlet valve 6 and the outlet valve 7 are closed so that the brake pressure, present at the brake pressure output 4 and at the at least one wheel brake cylinder connected thereto, is held constant. To set this switch function, only the precontrol valve 8 of the inlet valve 6 is switched by powering its magnetic coil 31, whereby the respective valve rotor 34 is drawn axially inward from the valve seat 40 against the return force of the valve spring 35. As a result, the control chamber 50 of the inlet valve 6 is connected via the control channel 24 and valve bore 21 to the control channel 26 carrying the high control pressure, which is connected to the brake pressure input 3 via a further control channel 60 arranged in the base housing 11.

In the "reduce pressure" switch function of the valve unit 1, the inlet valve 6 is closed and the outlet valve 7 opened so that the brake pressure output 4 and at the at least one wheel brake cylinder connected thereto are purged via the purge output 5. To set this switch function, both precontrol valves 8, 9 are switched by powering of their magnetic coils 31, 32. By powering the magnetic coils 32 of the precontrol valve 9 assigned to the outlet valve 7, the respective valve rotor 37 is drawn axially inward away from the valve seat 41, against the return force of the valve spring 38, whereby the control chamber 52 of the outlet valve 7 is connected via the control channel 27 and valve bore 24 to a control channel 28 carrying the low control pressure, which is connected to the purge output 5 in a manner not shown.

The "maintain pressure" and "reduce pressure" switch functions of the valve unit 1 are antilock functions with which a braking-induced locking of the at least one assigned wheel is avoided. These switch functions are controlled by a corresponding actuation of the precontrol valves 8, 9 by a control unit of the anti-lock system, in which the signals from the wheel speed sensors are analyzed to detect an impending or existing locking of the braked wheels.

Because the precontrol valves 8, 9 are arranged lying when the valve unit 1 is in the installation position, i.e. in the longitudinal direction 13 parallel to the division plane 10 of the valve housing 2, the installation height of the valve cover 12 is very low and hence the dimensions of the entire valve unit 1 are particularly compact. This is particularly advantageous since, to achieve a short reaction time of the wheel brakes concerned when the anti-lock functions are actuated, such valve units 1 are arranged as close as possible to the assigned wheel brake cylinders and the installation space available there is normally small.

Due to the orientation of the solenoid valves 8, 9 with valve seats 40, 41 arranged adjacent to the diaphragms 16, 17 or the control chambers 50, 51 of the assigned diaphragm valves 6, 7, for both precontrol valves 8, 9 the pilot volumes to be filled or emptied on switching are particularly small. Advantageously, this leads to particularly short switching reaction times of the diaphragm valves 6, 7 when the solenoid valves 8, 9 are switched.

Assembly of the valve unit 1, and its overhaul in which the diaphragms 16, 17 are to be replaced with new ones, are substantially simplified due to the over-molding 39 of the insert part 30 containing the magnetic coils 31, 32 and the mechanical components 33-35, 36-38 of the precontrol valves 8, 9. Also, due to the plastic over-molding 39 of the insert part 30, the connecting bush 45 of the magnetic coils 31, 32 can be arranged flexibly according to the requirements of the respective vehicle manufacturer, i.e. if required with different bush shape and different orientation, at various places on the housing cover 12. Also, the over-molding 39 optimally protects the solenoid valves 8, 9 from the penetration of moisture and dirt particles from the outside.

FIGS. 1 to 4 show, in two perspective views and two section views, a preferred practical embodiment of the valve unit 1 in which the connecting bush 45 for the magnetic coils 31, 32 of the precontrol valves 8, 9 is arranged close to the brake pressure input 3 of the housing cover 12, the housing cover 12 is connected to the base housing 11 by means of a shackle element 62, and the base housing 11 is connected to a silencer 75 at the purge output 5.

The shackle element 62, produced integrally by sheet metal pressing and punching, is attached to the base housing 11 and with its largely flat pressure plate 63 lies on a flat outer wall 64 of the housing cover 12 oriented parallel to the division plane 10 of the valve housing 2, generating a spring-elastic pretension force. In the longitudinal direction 13 of the valve housing 2, the shackle element 62 is provided on one side with two hinge arms 65, 66 which laterally surround the housing cover 12 and the base housing 11 and are attached to the base housing 12 via a hinge pin 69 engaging in a hinge bore 65, 66. Opposite the hinge arms 65, 66 in the longitudinal direction 13, the shackle element 62 is provided with a fixing tab 70 which is oriented largely parallel to the pressure plate 63 and has a bore 71 via which the shackle element 62 is screwed to the base housing 11 by means of a screw 72, generating a spring-elastic pretension force. In order to be able to make the fixing tab 70 smaller and hence the shackle element 62 more stable, the base housing 11 has a post-like protrusion 73 opposite the hinge pin 69 in the longitudinal direction 13, which protrudes over the division plane 10 vertically in the direction of the housing cover 12 and has a threaded bore 74 for screw connection of the fixing tab 70.

In comparison with a conventional flange bolting of the housing cover 12 to the base housing 11, fixing via the shackle element 62 is more economic to produce and takes up less installation space. Also, in this way the valve housing 2 can be opened and re-closed with lower assembly complexity for maintenance and repair purposes, in particular for overhaul of the valve unit in which for example the diaphragms of the diaphragm valves 6, 7 can be replaced.

The silencer 75 comprises a largely cylindrical silencer housing 76 with an inlet opening 77, a calming chamber 78 arranged radially on the inside, a large outlet opening 79 and a silencer insert 80.1 arranged upstream of the outlet opening 79 inside the silencer housing 76 and made of an air-permeable and sound-deadening material, and is attached to the base housing 11 with base walls 83, 84 oriented parallel to the division plane 10 of the valve housing 2 between the brake pressure input 3 and the brake pressure output 4.

Figure 5A:
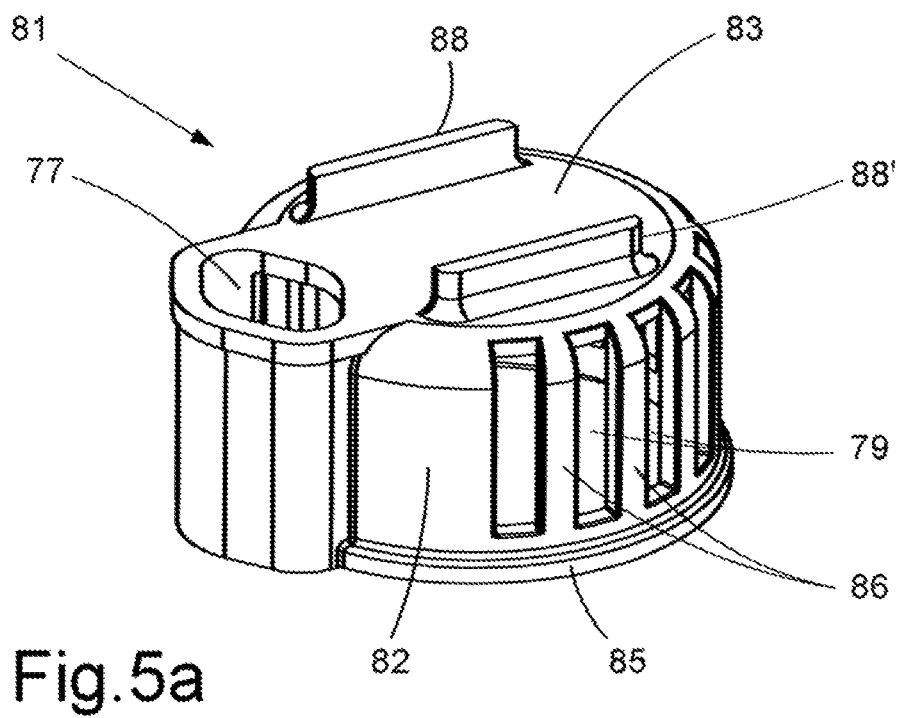
FIG. 5a shows a housing part of the silencer according to FIGS. 1 to 4 in a first perspective view.
Figure 5B:
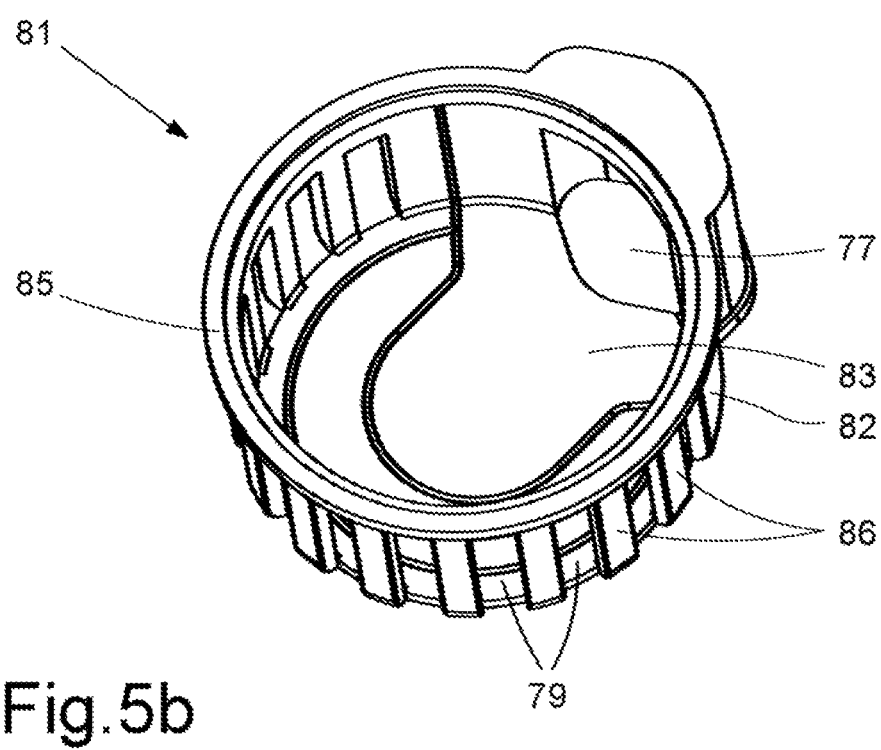
FIG. 5b shows the housing part of the silencer according to FIGS. 1 to 4 in a second perspective view.

As shown in particular from the perspective views of FIG. 5a and FIG. 5b, the silencer housing 76 consists of a largely pot-like cylindrical bottom housing 81 with a cylinder wall 82, a housing floor 83 and the flat housing lid 84. The housing floor 83 of the bottom housing 81, in the installed state, faces the division plane 10 of the valve housing 2 and has the inlet opening 77 lying against the purge output 5. The outlet opening 79 of the silencer housing 76 is formed in the cylinder wall 82 of the base housing 81 and extends with an orientation relative to the brake pressure input 3 over an angular range of around 270°. In order to achieve an adequate stability of the silencer housing 76 and support of the silencer insert 80.1 despite the large outlet opening 79, the outlet opening 79 is divided by a plurality of webs 86 distributed over the periphery between the housing floor 83 and an outer edge 85 of the bottom housing 81.

Figure 4:
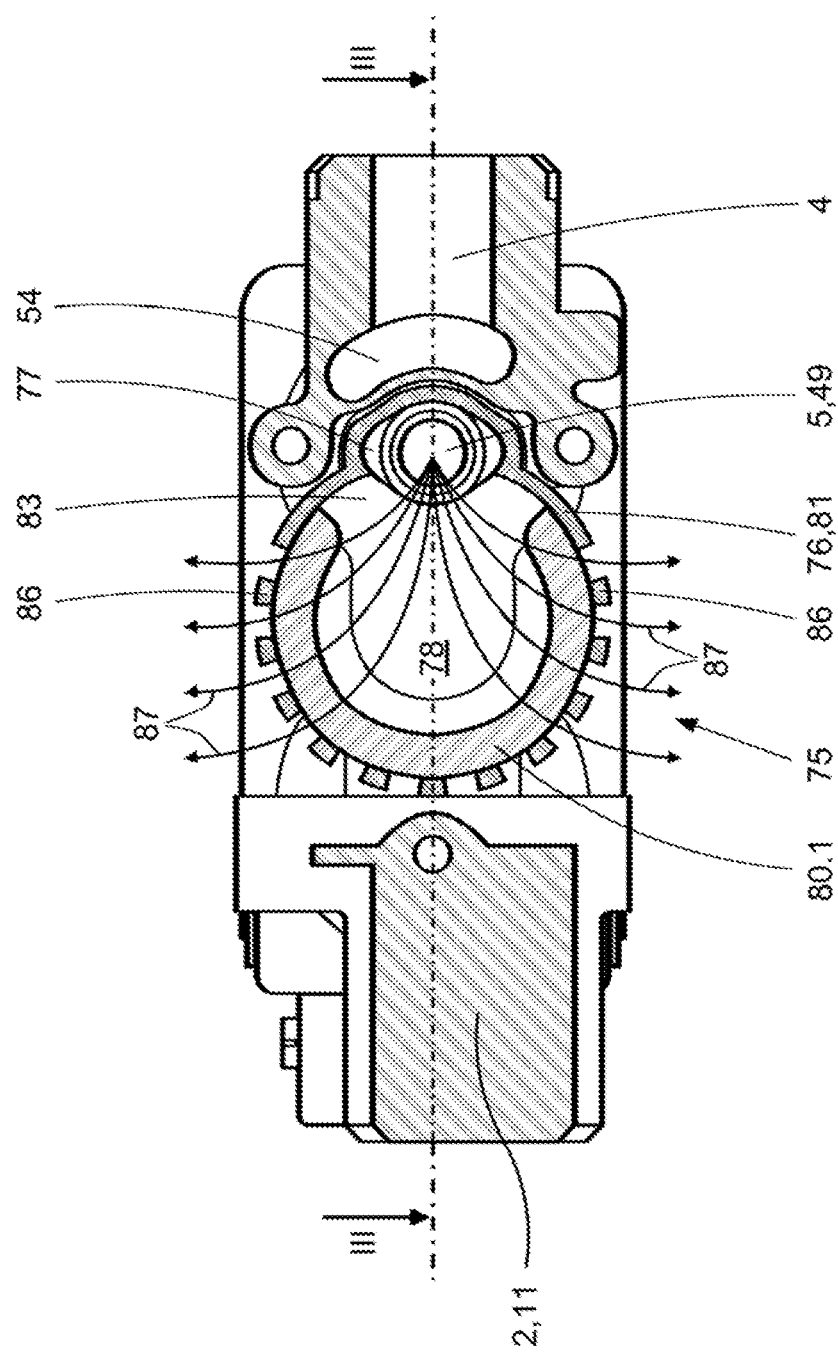
FIG. 4 shows the embodiment of the valve unit according to FIGS. 1 and 3 in a horizontal section.

When the outlet valve 7 is opened, compressed air flows at relatively high pressure out of the brake line portion connected to the brake pressure output 4, as indicated by the flow arrows 87 in the section view of FIG. 4, via the purge output 5 and the inlet opening 77, into the calming chamber 78 of the silencer 75 and from there, via the silencer insert 80.1 and outlet opening 79 into the environment. Because of the relatively large volume of the calming chamber 78, the large outlet opening 79 and the sound-deadening material of the silencer insert 80.1, the flow speed of the composite air is reduced and evened out. In this way, the noise level of the emerging compressed air—which, in a compressed air jet emerging at high flow speed at the brake pressure output 4 is caused substantially by turbulence at the jet edge—is significantly reduced with relatively simple means. In addition, the purge output 5 and the outlet valve 7 upstream thereof are also protected in particular by the silencer insert 80.1 of the silencer 75 against the penetration of splash water and eddying dirt particles.

As evident from the perspective view of FIG. 5*a*, to facilitate assembly and fix the position of the bottom housing 81, the housing floor 83 has two webs 88, 88' running in the longitudinal direction 13 and oriented axially outward, i.e. in the installed state pointing in the direction of the division plane 10 of the valve housing 2, which in the installed state engage in correspondingly formed groove-like recesses of the base housing 11.

Figure 6:
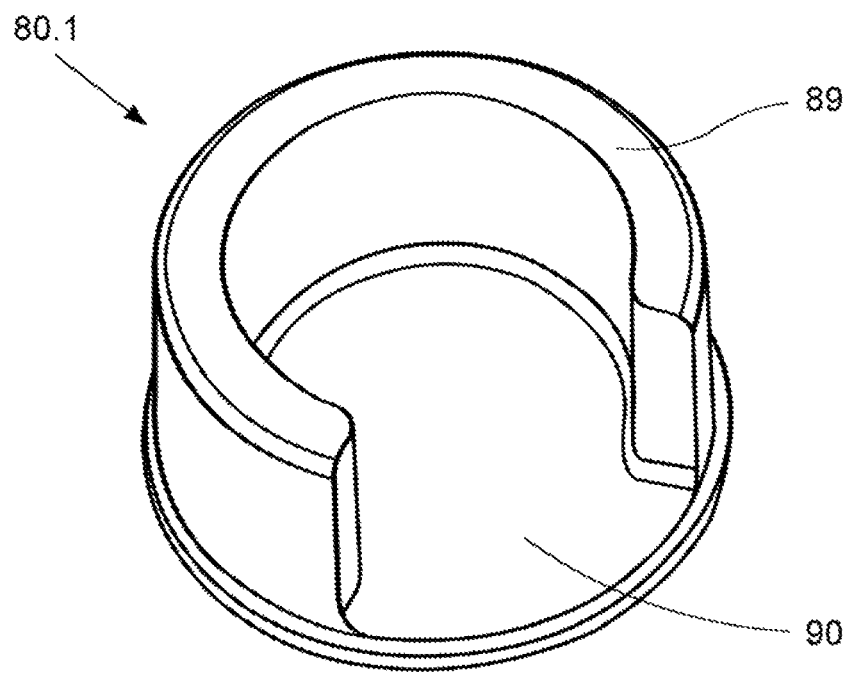
FIG. 6 shows a first embodiment of a silencer insert of the silencer according to FIGS. 1 to 5b in a perspective view.

In a first embodiment according to FIG. 6, the silencer insert 80.1 has a partially cylindrical shell 89 which in the installed state, lies on the inside against the outlet opening 79 of the silencer housing 76 and is reinforced by a circular flat floor portion 90.

Figure 7:
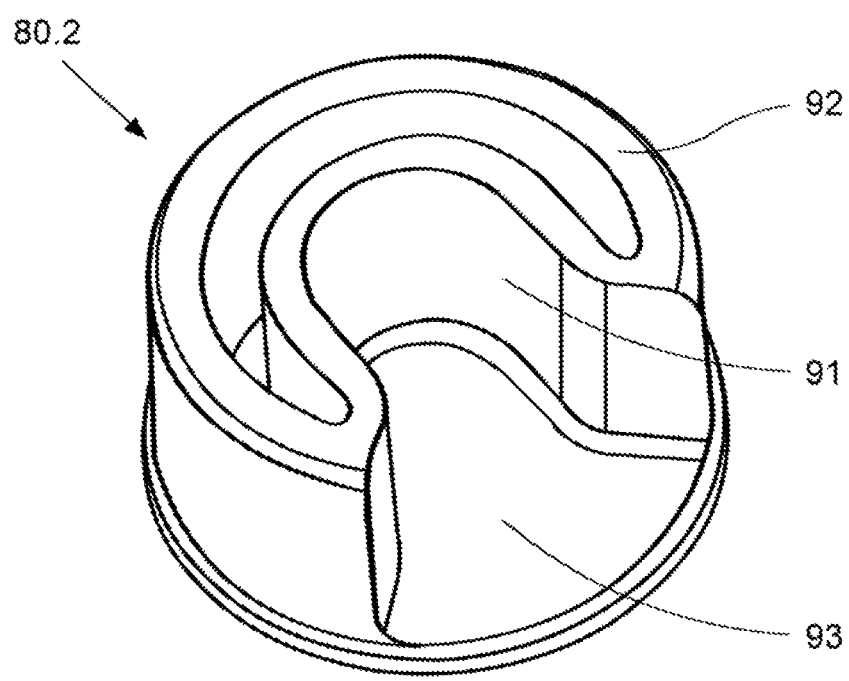
FIG. 7 shows a second embodiment of a silencer insert of the silencer according to FIGS. 1 to 5b in a perspective view.

In a second embodiment according to FIG. 7, the silencer insert 80.2 has two partially cylindrical shells 91, 92 which are arranged coaxially to each other and radially spaced apart, and are connected by a circular floor portion 93 and circumferentially directly connected together, and of which the radially outer shell 92, in the installed state, lies on the inside against the outlet opening 79 of the silencer housing 76.

The silencer insert 80.1, 80.2 may be made as a braid of mineral fibers, metal fibers or plastic fibers, as a sintered component of metal or plastic, or as a porous casting of metal or plastic.

Figure 1:
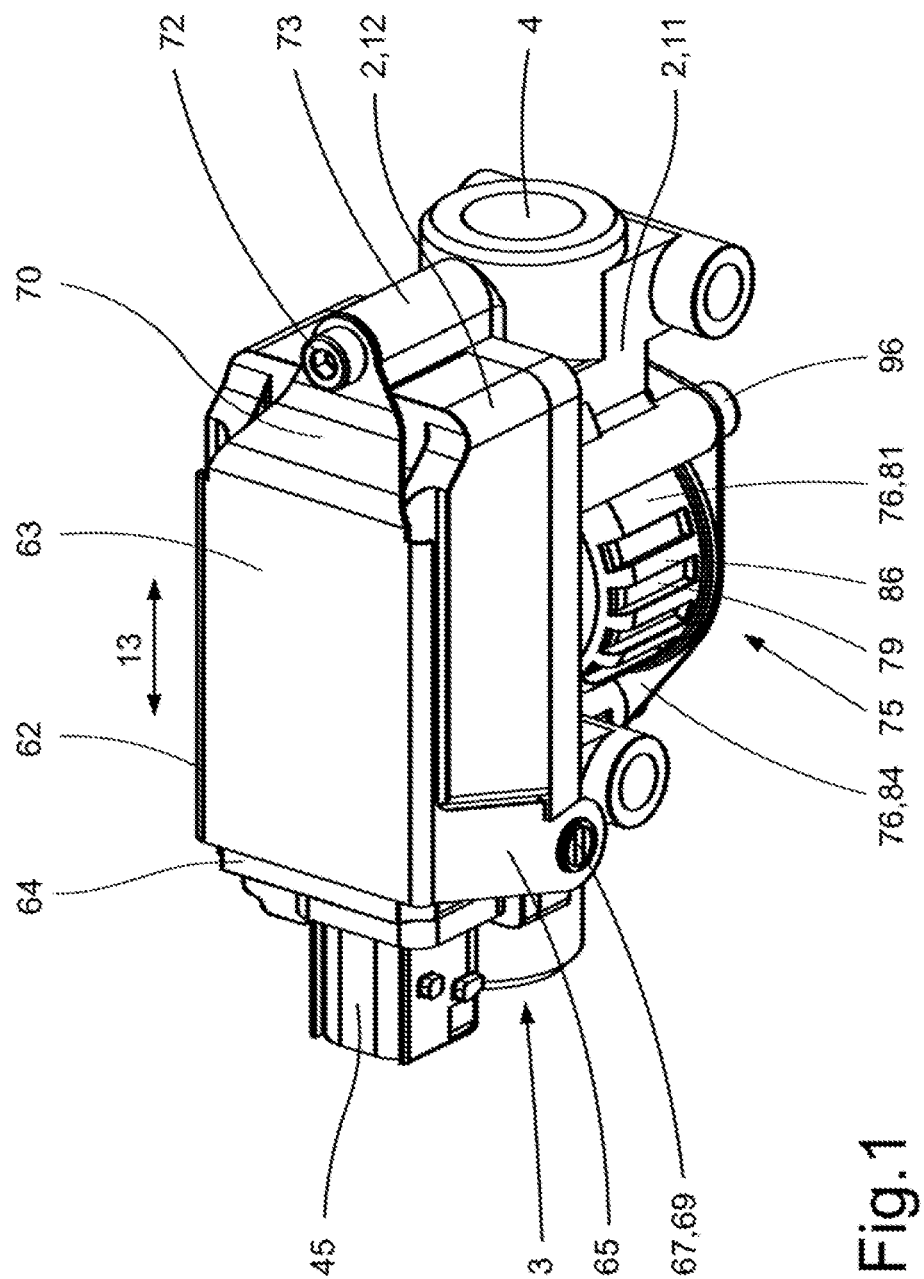
FIG. 1 shows a preferred embodiment of a valve unit with a silencer in a first perspective view.
Figure 2:
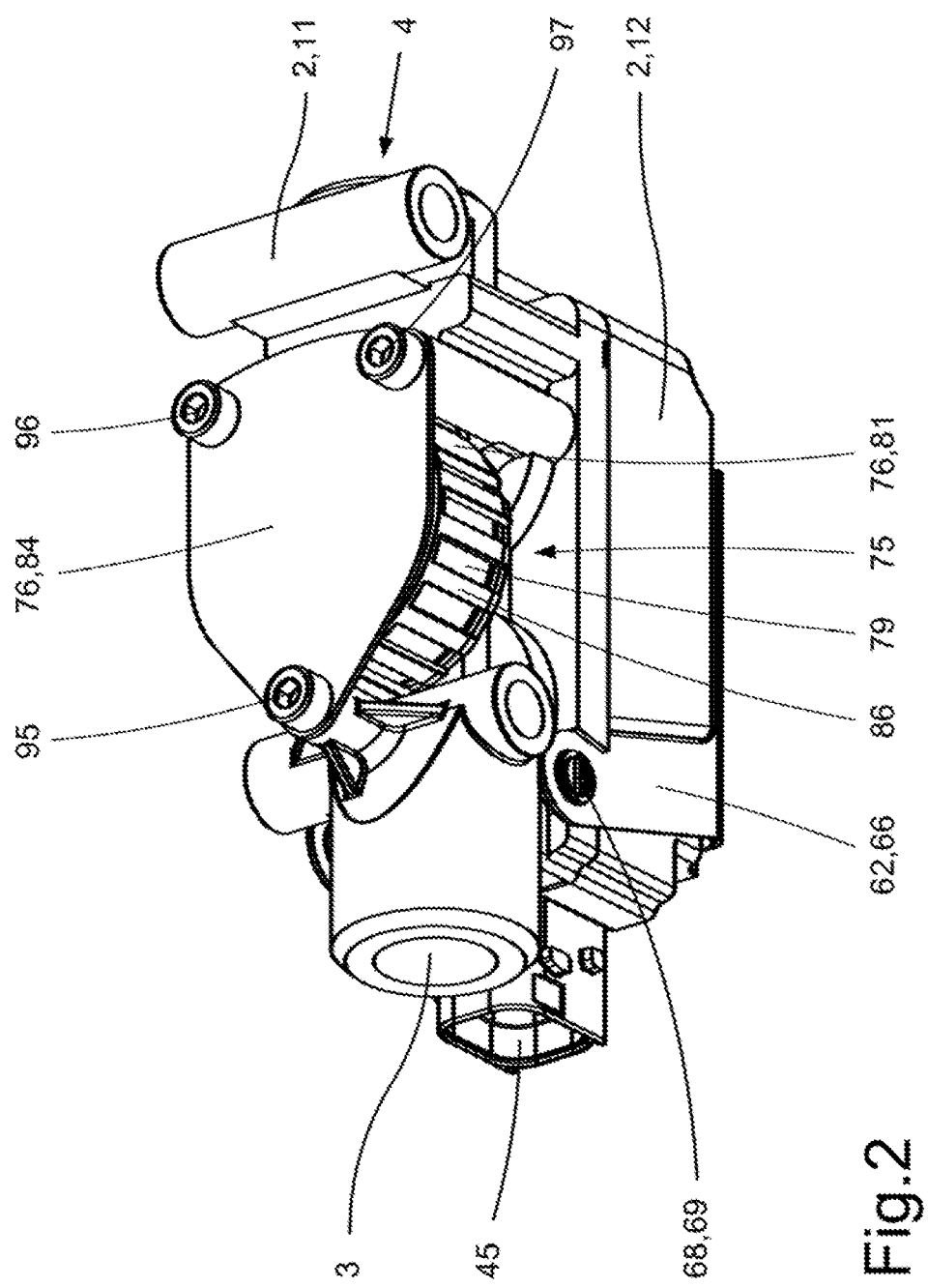
FIG. 2 shows the embodiment of the valve unit according to FIG. 1 in a second perspective view.
Figure 3:
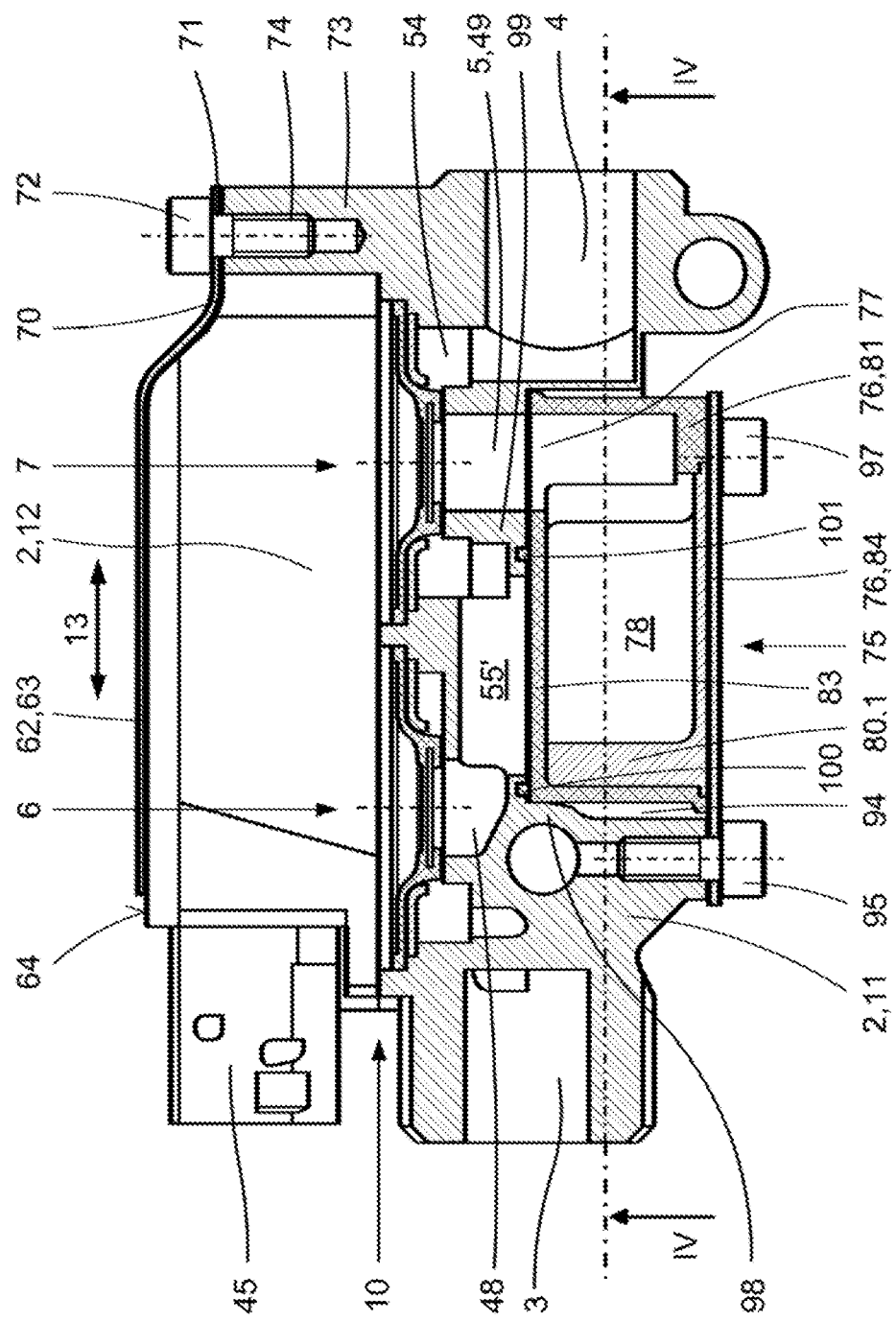
FIG. 3 shows the embodiment of the valve unit according to FIG. 1 and FIG. 2 in a longitudinal central section.

As can be seen particularly clearly in the section view of FIG. 3, in which the base housing 11 and shackle element 62 are depicted in a longitudinal central section and the housing cover 12 in a side view, the base housing 11 on its underside facing away from the division plane 10 has a recess 94 in which the silencer housing 76 is largely inserted. As a result, the dimensions of the valve unit 2 are scarcely enlarged by the silencer 75 in comparison with a valve unit without silencer. In the present case, the silencer housing 76 is attached to the valve housing 2 indirectly by a screw connection, comprising three screws 95, 96, 97, between the housing lid 84 and the base housing 11. In comparison with a separate fixing of the housing lid 84 to the bottom housing 81, and of the entire silencer housing 76 to the base housing 11, this saves installation space and reduces the assembly complexity.

Figure 10:
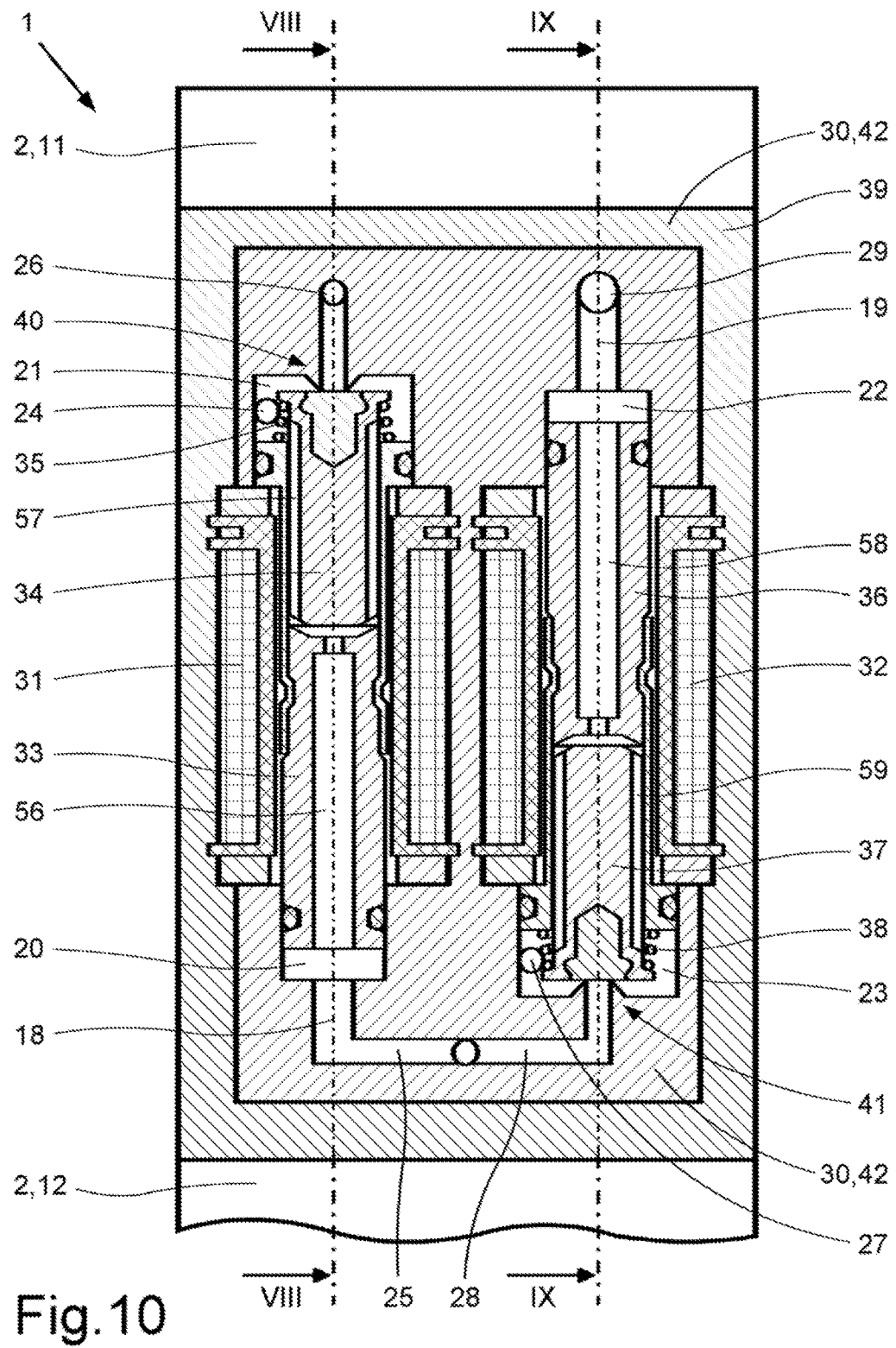
FIG. 10 shows the embodiment of the valve unit according to FIG. 8 and FIG. 9 in a horizontal section.

In the section view of FIG. 3, it is clear that the connecting channel 55' which is connected via the central channel 48 of the inlet valve 6 to the ring channel 54 of the outlet valve 7, in the present case—in contrast to the design in principle of the valve unit 1 according to FIGS. 8 to 10—is now configured open towards the outside, which has the advantage of easier decoring when the base housing 11 is produced conventionally as a diecast alloy component. The housing floor 83 of the bottom housing 81, in the installed state of the silencer 75, also fulfils the function of closing the connecting channel 55' towards the outside. To seal the connecting channel 55', sealing elements 100, 101 are arranged between housing walls 98, 99 which delimit the connecting channel 55' and the housing floor 83 of the bottom housing 81, which elements in the present case are configured for example as sealing strips laid in transverse grooves of the housing walls 98, 99.

While the above description constitutes the preferred embodiments of the present invention, it will be appreciated that the invention is susceptible to modification, variation and change without departing from the proper scope and fair meaning of the accompanying claims.

The invention claimed is:

1. A valve unit (1) for modulating pressure in a compressed air braking system, the valve unit comprising:
 a brake pressure input (3),
 a brake pressure output (4) and a purge output (5),
 an inlet valve (6) configured as a diaphragm valve,
 an outlet valve (7) configured as a diaphragm valve,
 for each of the diaphragm valves (6, 7), respective precontrol valves (8, 9) which are each configured as a 3/2-way solenoid valve,
 an elongate valve housing (2) that is divided by a division plane (10) extending horizontally in an installation position into a base housing (11) and a housing cover (12), wherein the brake pressure input (3) and the brake pressure output (4) and the purge output (5) are arranged in the valve base housing (11), the diaphragm valves (6, 7) are arranged behind each other in the longitudinal direction (13) in the base housing (11) between the brake pressure input (3) and the brake pressure output (4), with parallel actuation axes (14, 15) and with an arrangement of diaphragms (16, 17) associated with the diaphragm valves in a common diaphragm plane parallel to and proximate to the division plane (10) and clamped between the base housing (11) and the housing cover (12), and wherein the precontrol valves (8, 9) are arranged in the housing cover (12), and
 a silencer (75) at the purge output (5), the silencer including a cylindrical silencer housing (76) with an inlet opening (77), a calming chamber (78) arranged radially inside the silencer, a large outlet opening (79) and a silencer insert (80.1, 80.2) arranged upstream of the outlet opening (79) inside the silencer housing (76) and made of an air-permeable and sound-deadening material, wherein the silencer (75) is attached to the base housing (11) with base walls (83, 84) oriented parallel to the division plane (10) between the brake pressure input (3) and the brake pressure output (4).

2. A valve unit (1) for modulating pressure in a compressed air braking system, the valve unit comprising:
 a brake pressure input (3),
 a brake pressure output (4) and a purge output (5),
 an inlet valve (6) configured as a diaphragm valve,
 an outlet valve (7) configured as a diaphragm valve,
 for each of the diaphragm valves (6, 7), respective precontrol valves (8, 9) which are each configured as a 3/2-way solenoid valve,
 an elongate valve housing (2) that is divided by a division plane (10) extending horizontally in an installation position into a base housing (11) and a housing cover (12), wherein the brake pressure input (3) and the brake pressure output (4) and the purge output (5) are arranged in the valve base housing (11), the diaphragm valves (6, 7) are arranged behind each other in the longitudinal direction (13) in the base housing (11) between the brake pressure input (3) and the brake pressure output (4), with parallel actuation axes (14, 15) and with an arrangement of diaphragms (16, 17) associated with the diaphragm valves in a common diaphragm plane parallel to and proximate to the division plane (10) and clamped between the base housing (11) and the housing cover (12), and wherein the precontrol valves (8, 9) are arranged in the housing cover (12), and a silencer (75) at the purge output (5), the silencer including cylindrical silencer housing (76) with an inlet opening (77), a calming chamber (78) arranged radially inside the silencer, a large outlet opening (79) and a silencer insert (80.1, 80.2) arranged upstream of the outlet opening (79) inside the silencer housing (76) and made of an air-permeable and sound-deadening material, wherein the silencer (75) is attached to the base housing (11) with base walls (83, 84) oriented parallel to the division plane (10) between the brake pressure input (3) and the brake pressure output (4), wherein the silencer housing (76) consists of a pot-shaped cylindrical bottom housing (81) with a cylinder wall (82) and a housing floor (83), and of a flat housing lid (84), wherein in the installed state, the housing floor (83) of the bottom housing (81) faces the division plane (10), the inlet opening (77) lying against the purge output (5).

3. The valve unit as claimed in claim 2, wherein the outlet opening (79) of the silencer housing (76) is arranged in the cylinder wall (82) of the bottom housing (81) and extends relative to the brake pressure input (3), over an angular region of at most 270°.

4. The valve unit as claimed in claim 3, wherein the outlet opening (79) contains a plurality of webs (86) that are evenly distributed over a periphery of the bottom housing (81) and arranged between the housing floor (83) and an outer edge (85) of the bottom housing (81).

5. The valve unit as claimed in claim 2, wherein the housing floor (83) of the bottom housing (81) comprises at least one elevation (88, 88') directed axially outward, which in the installed state engages in a corresponding recess in the base housing (11).

6. The valve unit as claimed in claim 1, wherein the silencer insert (80.1) has a partially cylindrical shell (89) which in the installed state, lies inside the silencer housing (76) against the outlet opening (79) of the silencer housing (76) and is reinforced by a circular flat floor portion (90).

7. The valve unit as claimed in claim 1, wherein the silencer insert (80.2) has two partially cylindrical shells (91, 92) which are arranged coaxially to each other and radially spaced apart, and are connected by a circular floor portion (93) and circumferentially directly connected together, and of which the radially outer shell (92), in the installed state, lies on the inside against the outlet opening (79) of the silencer housing (76).

8. The valve unit as claimed in claim 1, wherein the silencer insert (80.1, 80.2) is a braid of mineral fibers, metal fibers or plastic fibers.

9. The valve unit as claimed in claim 1, wherein the silencer insert (80.1, 80.2) is a sintered component of metal or plastic.

10. The valve unit as claimed in claim 1, wherein the silencer insert (80.1, 80.2) is a porous casting of metal or plastic.

11. The valve unit as claimed in claim 1, wherein the base housing (11) of the valve unit (1) has an underside facing away from the division plane (10) and has a recess (94) in which the silencer housing (76) is at least partially inserted in the installed state.

12. A valve unit (1) for modulating pressure in a compressed air braking system, the valve unit comprising:
   a brake pressure input (3),
   a brake pressure output (4) and a purge output (5),
   an inlet valve (6) configured as a diaphragm valve,
   an outlet valve (7) configured as a diaphragm valve,
   for each of the diaphragm valves (6, 7), respective precontrol valves (8, 9) which are each configured as a 3/2-way solenoid valve,
   an elongate valve housing (2) that is divided by a division plane (10) extending horizontally in an installation position into a base housing (11) and a housing cover (12), wherein the brake pressure input (3) and the brake pressure output (4) and the purge output (5) are arranged in the valve base housing (11), the diaphragm valves (6, 7) are arranged behind each other in the longitudinal direction (13) in the base housing (11) between the brake pressure input (3) and the brake pressure output (4), with parallel actuation axes (14, 15) and with an arrangement of diaphragms (16, 17) associated with the diaphragm valves in a common diaphragm plane parallel to and proximate to the division plane (10) and clamped between the base housing (11) and the housing cover (12), and wherein the precontrol valves (8, 9) are arranged in the housing cover (12), and a silencer (75) at the purge output (5), the silencer including cylindrical silencer housing (76) with an inlet opening (77), a calming chamber (78) arranged radially inside the silencer, a large outlet opening (79) and a silencer insert (80.1, 80.2) arranged upstream of the outlet opening (79) inside the silencer housing (76) and made of an air-permeable and sound-deadening material, wherein the silencer (75) is attached to the base housing (11) with base walls (83, 84) oriented parallel to the division plane (10) between the brake pressure input (3) and the brake pressure output (4),
   wherein the silencer housing (76) is fixed to the valve housing (2) by a screw connection (95, 96, 97) of a housing lid (84) of the silencer housing (76) to the base housing (11).

13. The valve unit as claimed in claim 1, wherein a connecting channel (55') inside the base housing, adjacent to the silencer and open toward the silencer is closed in the installed state by a housing floor (83) of the silencer housing (76), and wherein sealing elements (100, 101) are arranged between housing walls (98, 99) of the base housing (11) delimiting the connecting channel (55') and the housing floor (83).

* * * * *